United States Patent [19]

Fan

[11] Patent Number: 5,408,558
[45] Date of Patent: Apr. 18, 1995

[54] CONNECTING SYSTEM WITH CLEAVED FIBER AND CRIMP TERMINATION

[75] Inventor: Robert J. Fan, Canoga Park, Calif.

[73] Assignee: LiteCom, Inc., North Hollywood, Calif.

[21] Appl. No.: 140,261

[22] Filed: Oct. 21, 1993

[51] Int. Cl.⁶ ............................................. G02B 6/36
[52] U.S. Cl. .................................... 385/80; 385/77; 385/78; 385/81; 385/84; 385/85; 385/87; 385/139
[58] Field of Search ............... 385/77, 78, 80, 81, 385/84, 85, 86, 87, 139

[56] References Cited

U.S. PATENT DOCUMENTS

| | | | |
|---|---|---|---|
| 4,076,376 | 2/1978 | Slaughter | 385/56 X |
| 4,407,561 | 10/1983 | Wysocki | 385/128 X |
| 4,440,469 | 4/1984 | Schumacher | 385/81 |
| 4,752,111 | 6/1988 | Fisher | 385/55 X |
| 4,822,130 | 4/1989 | Maranto et al. | 385/138 X |
| 4,848,870 | 7/1989 | Wisecarver | 385/55 X |
| 4,884,864 | 12/1989 | Ellis et al. | 385/55 X |
| 4,892,381 | 1/1990 | Glasheen | 385/54 X |
| 4,961,624 | 10/1990 | Savitsky et al. | 385/81 X |
| 5,011,258 | 4/1991 | Takeda | 385/56 X |
| 5,018,824 | 5/1991 | Ooe et al. | 385/99 X |
| 5,071,218 | 12/1991 | Nishimoto | 385/78 X |
| 5,102,211 | 4/1992 | Slaney et al. | 385/81 |
| 5,131,063 | 7/1992 | Monroe et al. | 385/78 |
| 5,152,761 | 10/1992 | Muller et al. | 385/84 X |
| 5,177,806 | 1/1993 | Abbott | 385/76 |
| 5,216,733 | 6/1993 | Nagase et al. | 385/139 X |
| 5,241,613 | 8/1993 | Li et al. | 385/78 |
| 5,282,258 | 1/1994 | Hoshino | 385/70 |
| 5,307,432 | 4/1994 | Chin et al. | 385/81 |

*Primary Examiner*—Brian Healy

[57] ABSTRACT

An optical fiber connecting means for positioning and securing an optical fiber such that the optical fiber may be joined with a mating optical fiber, the connecting means having an endface, the endface which may have a recess or counterbore provided to allow a controlled unsupported fiber length which will contribute to a superior optical fiber endface cleave when cleaving is the method of fiber termination. Cleaving may be accomplished with rotational or tangential scribing while the fiber periphery is under tension, the tension condition enhanced by the unsupported fiber length at the terminus endface. Polished fiber ends may also be used.

33 Claims, 8 Drawing Sheets

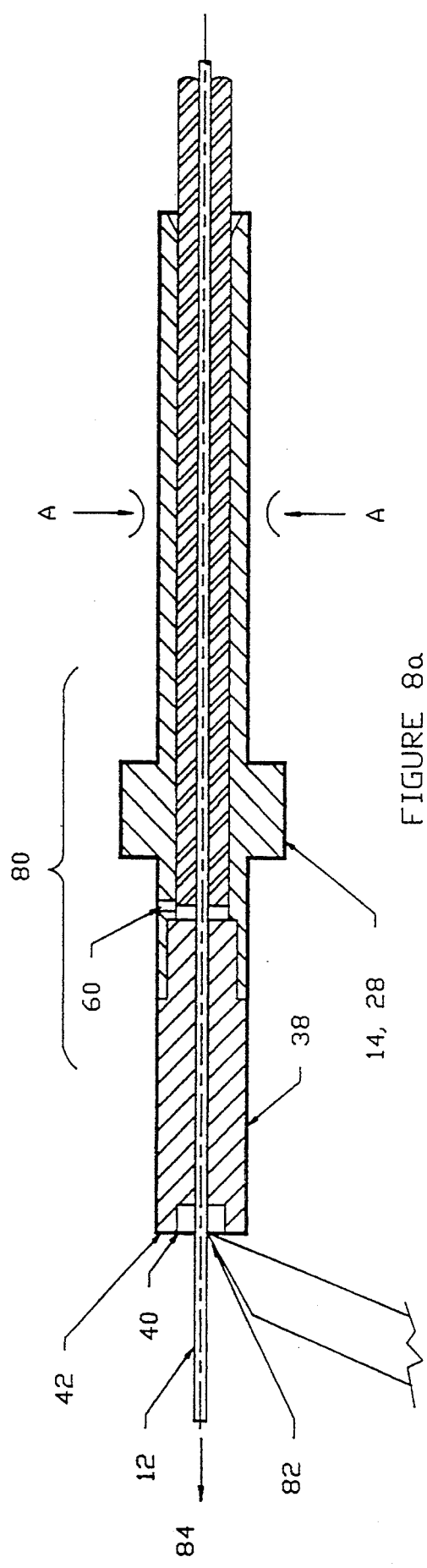
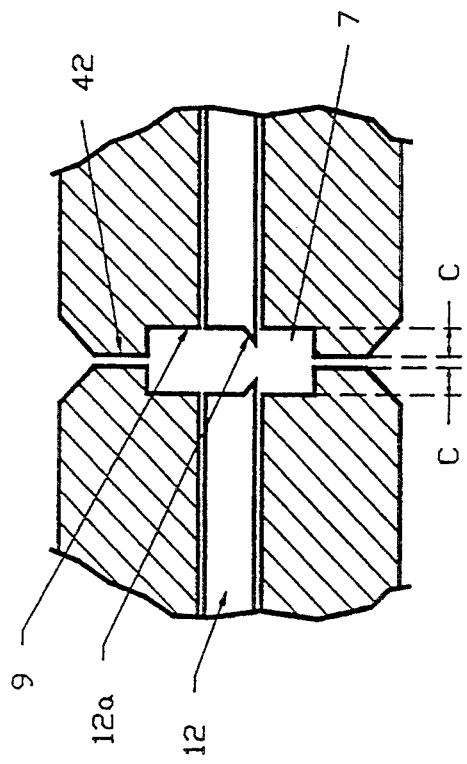
FIGURE 8a
FIGURE 8b PRIOR ART

CONNECTING SYSTEM WITH CLEAVED FIBER AND CRIMP TERMINATION

FIELD OF THE INVENTION

This invention relates to connecting systems for field operations and more particularly relates to fiber optic connecting systems generally using a cleaved fiber end preparation and mechanical crimping or a form of bonding to terminate the fiber in an optical terminus.

BACKGROUND OF THE INVENTION

Connecting systems and in particular fiber optic connecting systems present significant installation and maintenance problems. Installation techniques include fiber/cable preparation; termination of the fiber in the pin or socket terminus and handling/cleaning of termini during installation in a connector. Termination of the fiber within the terminus must be accomplished by a means which will firmly affix the fiber and which will prevent the fiber from experiencing any movement from the position established. It is known that exposure to broad temperature differentials can cause slight axial displacement or pistoning of the fiber end in the terminus. In prior art it has been shown that by intentionally leaving a slight gap between fibers the danger of pistoning is significantly reduced.

Whatever the means of terminating and firmly confining the fibers in the terminus, the task is delicate because of the importance in dealing with an optical fiber, not to stress it or to produce micro-bending which can result in severe damage to the fiber or substantially reduce the quality of an optical signal being transmitted.

In field termination situations, it is advantageous to utilize methods which require minimum skill, are relatively easy to use and which provide a rugged, durable terminus to protect and align the terminated fiber. One method used in prior art is to terminate with epoxy. Epoxy will firmly hold the fiber in place in the terminus once it is set and cured properly. However, the handling of epoxy in a field application can be troublesome. Mixing the epoxy, applying it and curing it are not easily accomplished tasks, especially in a field setting with possible contamination, confined workspace and lack of time for allowing curing to take place. Accelerated curing can be accomplished with external heat applied, but this may be hazardous with electric arcing in explosive environments or the heat may not be uniformly applied causing improper termination which is not easily detectable.

Another method of terminating a fiber to a connecting terminus is to crimp the fiber into the terminus. Mechanical crimping of the metal terminus body onto the buffered fiber can be safely used to firmly affix the fiber within the terminus. Care must be exercised to assure that the fiber construction includes adequate firm yet resilient buffer coating material to be crimped and that the amount of crimping is precisely controlled to assure that the fiber is firmly held in place and yet the metal crimped terminus body is not inducing excessive stress or microbending when crimped onto the optical fiber.

Yet another aspect of fiber termination in a connectorized fiber optic terminus is the manner of end preparation of the optical signal transmitting fiber itself. Fiber ends must have a mirror-smooth finish perpendicular to the fiber central axis for optimum signal transmission. This end finish can be accomplished through a series of polishing steps. The final polish is a very fine controlled operation attempting to leave the fiber end with the desired high quality mirror endface finish. However, in field situations, using polishing materials, special bushings and somewhat skilled polishing techniques, may be disadvantageous, depending on the field terminating conditions.

An alternative to using polishing for terminating fibers is to use the cleaving method. In cleaving, the fiber is generally placed in tension or bent to the side to provide tension on the periphery of the fiber. A scribing tool with a diamond scriber is brought into passing contact with the fiber periphery, inducing a stress on the fiber. This stress concentration results in a crack initiation and a final crack propagation across the fiber diameter. When properly controlled, the fiber endface created will have a perpendicular or controlled angle mirror-smooth finish.

Because the fiber is made of glass and is subject to damage if the endface comes in contact with foreign objects, it must be protected. Placing the fiber within a terminus body and affixing it in place with crimping or epoxy, and then cleaving the fiber assures that the finished fiber end will be protected by the terminus body from external damage.

SUMMARY OF THE INVENTION

It is a primary aim and object of the present invention to provide a means of terminating fiber optic signal transmitting termini resulting in high quality interconnecting low-loss ends. The preferred means of terminating utilizes cleaving of the optical signal transmitting fiber after the fiber is crimped or epoxied into the fiber optic ferrule. The first step, then, is to affix the terminus body to the fiber with a close-fitting inside diameter through which the buffered fiber may pass. In one embodiment, the buffered fiber is crimped into the terminus body with a tool which surrounds the outside diameter of the terminus body. A plurality of crimp tool indenters or facets of crimp die openings press against the metal terminus body in such a manner as to deform the periphery of the terminus body and simultaneously deform the inside diameter of the terminus body. This deformation presses into the buffer coating of the optical fiber, trapping it and holding it firmly fixed in the terminus body.

In another embodiment, the buffered fiber is secured within the terminus body with adhesive epoxy. The buffered fiber is positioned through the terminus body which has a close-fitting opening matching the buffer diameter at one end and a larger cavity at the other end to contain the epoxy adhesive used to secure the buffered fiber.

In both embodiments mentioned, the terminus body may have a precision aligning tip in place to guide a portion of the fiber with buffer coat removed. It is at the point which the fiber exits the precision aligning tip that the fiber must be prepared with a mirror finish which is perpendicular to the central axis of the fiber. This mirror finish is best provided in field applications by cleaving the fiber with a sharp scribe while tension is applied during or after the scribing operation.

Another form of termination procedure may be accomplished with a terminus body in which the precision alignment tip is positioned following the fixing of the terminus body on the buffered fiber, either by crimping or by use of epoxy. If the precision alignment tip is placed following terminus body placement on the buffered fiber, there will be a length of fiber between the point at which the fiber exits the terminus body and where it is cleaved. This will be the exact length of the precision alignment tip to be added following fiber cleaving. The advantage of this procedure is that the point at which the fiber is cleaved is unsupported by any confining alignment elements and may result in superior cleaves. The disadvantage is that the tip must be placed on the already finished fiber end and care must be exercised not to damage the prepared fiber tip during such a tip placement.

In yet another slight variation of embodiment, the tip is in place on the terminus body prior to cleaving of the fiber. However, the precision alignment tip has a recessed cavity at the tip interface plane which allows the fiber to be unsupported for a significant distance (approximately 3 to 4 times the fiber diameter) behind the tip face which may result in a superior cleaved fiber face. The reason for the unsupported length is that during the most successful cleaving process, the outer surface of the fiber must be placed in tension to allow the fiber scriber to initiate a crack and to propagate through the fiber diameter. This tension condition cannot take place if the fiber is totally supported all the way to the tip. By providing an unsupported distance, the fiber can yield at the designated point of cleaving, usually at or slightly below (approximately 0.003 mm max.) the end face of the terminus tip. Especially for the 360° rotational scribe motion around the fiber periphery at the time of cleaving, the recessed area needs to be a circular counterbore. The recess will allow the needed unsupported length and the remaining "rim" of terminus tip will protect the unsupported fiber length from subsequent external probing damage.

In the described cleave-after-crimp or cleave-after-epoxy methods, the cleaving operation may be accomplished in alternate manners. Cleaving may be done by a "scribe and bend" technique or have tension applied during the cleaving operation. The variations of termini and tips previously described may utilize a cleaving operation by different cleaving methods. The scribing of the fiber with a harder material such as hardened steel or diamond material may be accomplished with a single point intrusion of the scriber on the fiber periphery or may be accomplished with a rotational motion of the scriber about the fiber periphery.

BRIEF DESCRIPTION OF THE DRAWING

In the accompanying drawing:

FIG. 8a and b is a sectional view as in FIG. 4 with cleaving apparatus in position to scribe and cleave the fiber.

DESCRIPTION OF A PREFERRED EMBODIMENT

Figure 1:
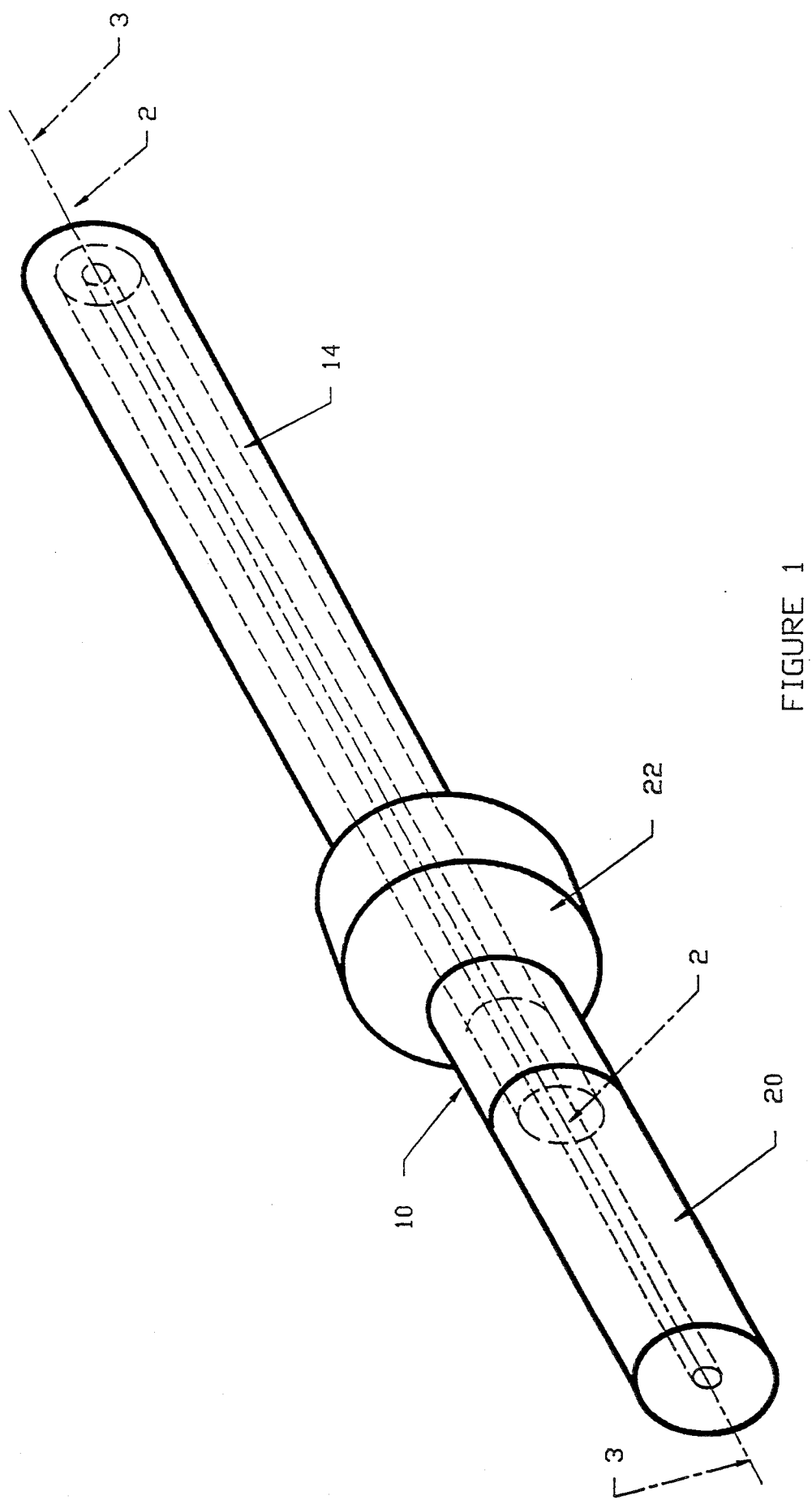
FIG. 1 is a perspective view of a terminus body of the present invention which serves as an optical fiber feedthrough means.
Figure 2:
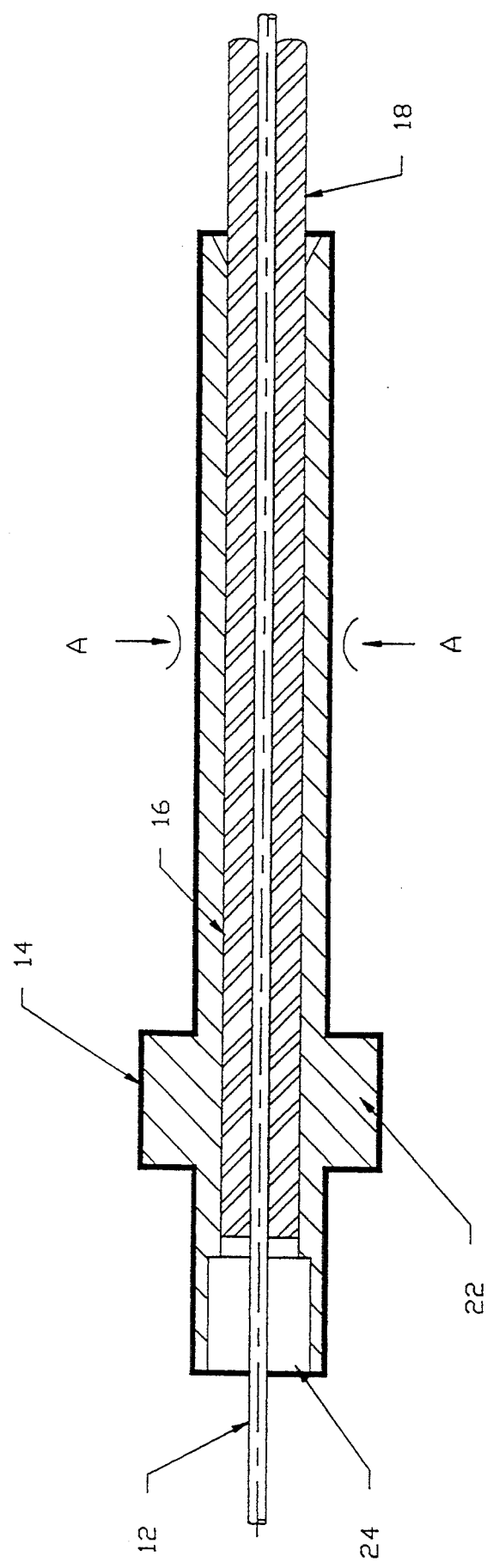
FIG. 2 is a sectional view taken along the line 2—2 of FIG. 1 and has crimping applied at points A—A.
Figure 4:
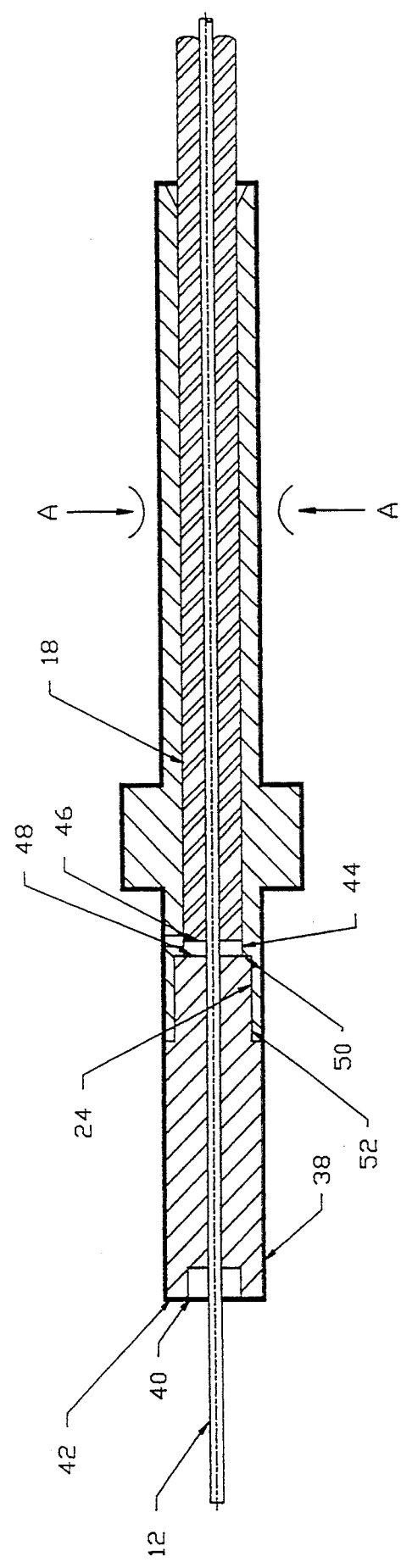
FIG. 4 is a sectional view taken along the line 3—3 of FIG. 1 and uses crimped confinement of the fiber, with a terminus tip positioned for the fiber to be cleaved in a third arrangement of the invention.

With reference to the drawings and particularly to FIGS. 1, 2 and 4, there is shown a two-piece fiber optic terminus identified generally as 10, which it will be described, is assembled or terminated to an optical fiber 12 with a securing means for assuring precise positioning of the fiber within the terminus without micro-bending the fiber. Micro-bending is known to possibly decrease the optical signal transmission there through. It will also be shown that there are various means to terminate the fiber end precisely at the desired location relative to the terminus tip. The advantage to securing the fiber within the terminus prior to the fiber end preparation through cleaving or polishing is that the location of the end of the fiber relative to the part in which the fiber is secured can be precisely established, allowing preferred fiber end position. The terminus 10 is comprised of the terminus body 14 which is cylindrical with a hollow interior cylindrical cavity 16 into which fits slidingly the buffered fiber coating 18 of the optical fiber 12. In FIG. 6, a terminus tip 20 is affixed, as will be described, to the terminus body 14 to precisely center the optical fiber 12 at the end face 68 of the terminus tip 20. Here, the optical signal is transmitted to or received by the fiber to be connected, the signal being passed through a precisely prepared cleaved optical fiber 12 endface. The terminus body 14 has a radially outwardly extending flange 22 affixed to or unitary with the terminus body 14 outer surface for locating and positioning the complete terminus 10 in a connector assembly. The terminus body 14 has a counterbore 24 at one end which is slightly smaller than the outside diameter of the terminus tip 20 tail 26 to allow an interference fit of the terminus tip 20 into the terminus body 14 assuring a fixed precise optical fiber 12 endface location. The optical fiber 12 is secured within terminus body 14 by controlled crimping on the periphery of terminus body 14 at a location such as A—A or other suitable location on the periphery. This crimping may be induced by radially intruding indenters, enclosed geometric configuration confinement or other means of upsetting the metallic wall of terminus body 14 and thereby causing inward deformation of the inside diameter cylindrical cavity 16 capturing and affixing in place buffer coat 18 and thus optical fiber 12.

Figure 3:
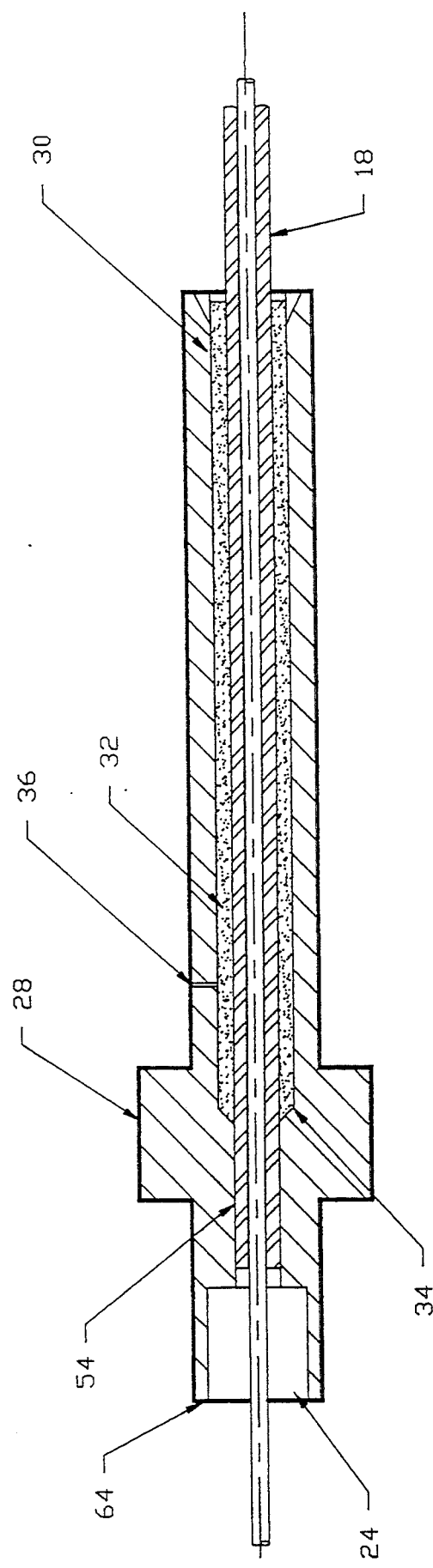
FIG. 3 is a sectional view as in FIG. 2 except that the fiber buffer is trapped with epoxy in a second version of the invention.

In a second embodiment of the invention shown in FIG. 3, a terminus body 28 is similar to terminus body 14 except that an enlarged counterbore 30 is provided to accommodate adhesive sealant or epoxy bonding material 32 which serves to bond the fiber buffer 18 securely to the inside diameter 30 of terminus body 28. The bonding material 32 may also be ceramic glass or low-melt metallic material. The counterbore 30 ends with transition wall 34 to keep epoxy from traveling to counterbore 24 prior to terminus tip 20 insertion. A side opening 36 is provided to facilitate bonding material 32 loading with a common needle/syringe tool. Placement of side opening 36 to the rear of transition wall 34 will assure little or no bonding material travels inward of side opening 36 but rather will flow in the path of least resistance to rearward. Bonding material 32 may alternatively be introduced to the area around buffered fiber coating 18 through side opening 36. The advantage to securing the fiber or buffered fiber within the terminus body 14 or 28 prior to securing of the terminus tip 20 is that if the fiber cleave is of insufficient quality, the parts discarded are of minimal expense if required to be replaced.

FIG. 4 shows an optional configuration of a terminus tip 38 which is similar to terminus tip 20 except that it has a counterbore 40 as relief for optical fiber 12 exit confinement which will enable improved cleaving (over prior art FIG. 8b) of optical fiber 12 flush with endface 42 of terminus tip 38 as more fully described in FIG. 8a. With terminus tip 38 installed, in FIG. 4, it can be seen that gap 44 separates end 46 of buffered fiber coating 18 from endface 48 of terminus tip tail 52. Gap 44 assures that terminus tip 38 can be positioned firmly against end 50 of counterbore 24 which accepts terminus tip tail 52. Optical fiber 12 is shown crimped firmly in place ready to be cleaved at terminus tip 38 parallel to endface 42.

Figure 5:
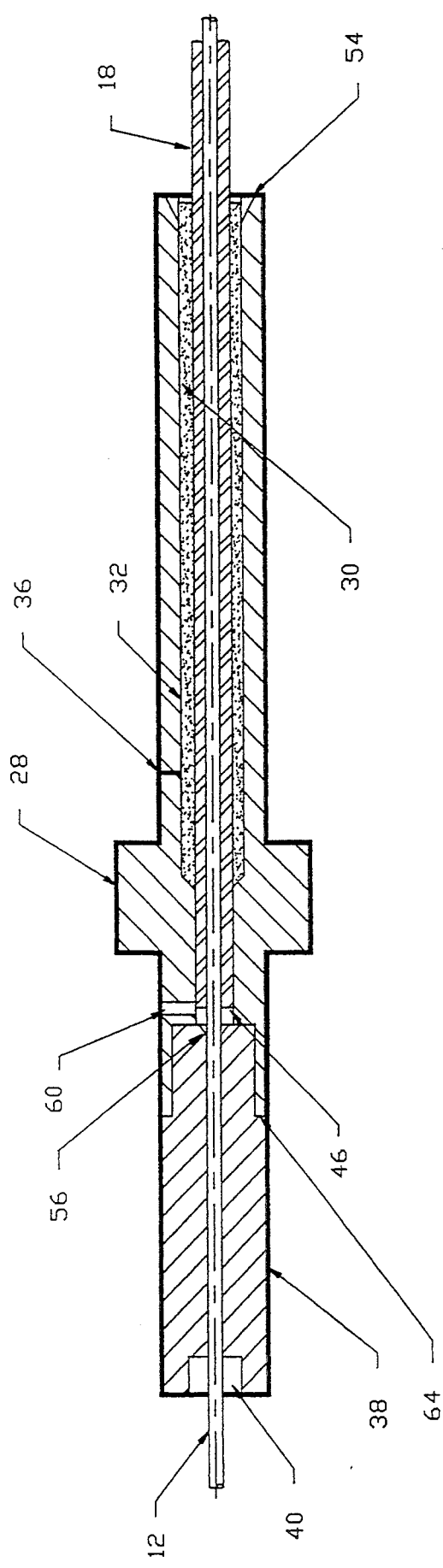
FIG. 5 is a sectional view as in FIG. 4 except the retention method is with epoxy.

FIG. 5 shows an embodiment as in FIG. 4 except that buffered fiber coating 18 is fixed in place with bonding material 32 rather than with the mechanical crimp A—A of FIG. 4. As in FIG. 3, bonding material 32 was used to secure buffered fiber coating 18 in place with the assistance of side opening 36 which relieves excess bonding material 32 if administered at terminus body rear 54 or if administered in side opening 36. In either case, the flow of epoxy will not travel forward since there is a close fit between buffered fiber coating 18 and counterbore 30. FIG. 5 also shows terminus tip 38 with a countersunk rear entry 56 assuring that optical fiber 12 will easily enter the throughhole of terminus tip 38. Terminus tip 38 has counterbore 40 which leaves the bare fiber unsupported for a distance allowing slight fiber axial deviation during cleaving which will result in a higher quality cleaved fiber endface in the cleaving operation.

Figures 6A, 6B:
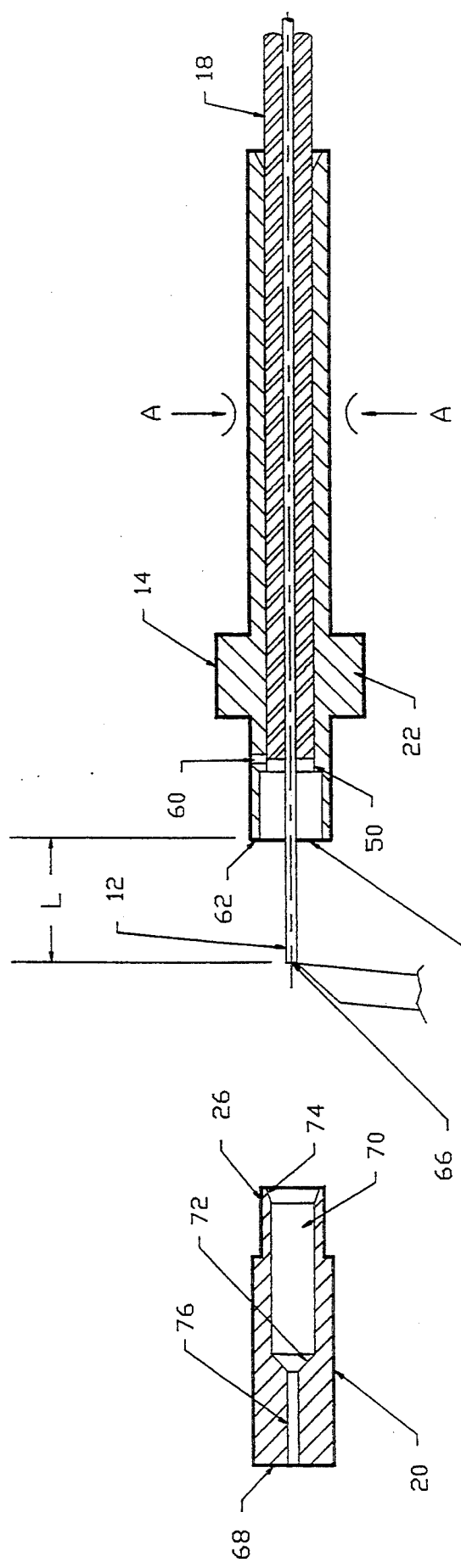
FIG. 6a and b is a sectional view as in FIG. 2 with the terminus tip positioned to be pressed onto the terminus body in a fourth arrangement of the invention.

In FIG. 6a and b, terminus tip 20 is shown having tail 26 constructed to enter with a light press fit into counterbore 24 of terminus body 14. Because buffered fiber coating 18 is crimped into place, or bonded into placeas in FIG. 3, there is a relief side hole 60 provided to allow escape of trapped air as terminus tip 20 tail 26 enters counterbore 40. This will enable terminus tip 20 tail 26 to seat securely against end 50 of counterbore 24. In FIG. 6, optical fiber 12 has been cleaved at a precise distance L away from endface 62 of terminus body 14. Thus, since terminus tip 20 is installed after optical fiber 12 has been cleaved at this precise distance, optical fiber 12 endface 66 will be flush with terminus tip 20 endface 68. Terminus tip 20 is also shown with counterbore 70 having countersink transition 72 to inside diameter 76 which is close-fitting to optical fiber 12. Counterbore 70 also has countersink entry 74 provided to assure smooth entry of fiber endface 66 into terminus tip 20.

Figure 7:
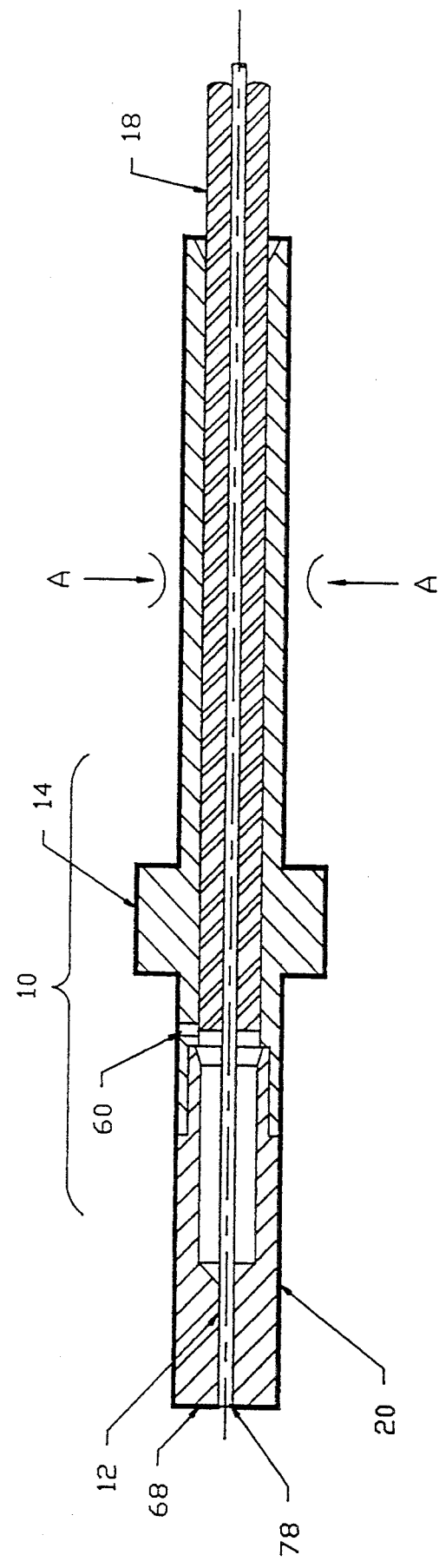
FIG. 7 is a sectional view as in FIG. 6 with terminus tip pressed onto the terminus body.

The assembled fiber optic terminus 10 can be seen in FIG. 7 with terminus tip 20 installed in terminus body 14 after buffered fiber coating 18 was crimped at A—A and after optical fiber 12 fiber endface 78 was cleaved, shown with location of fiber endface 78 being flush with or slightly recessed below terminus tip 20 endface 68.

FIG. 8a shows assembled fiber optic terminus 80 with terminus tip 38 pressed into terminus body 14 or alternatively into terminus body 28. Also shown is cleaving tool point 82 which may be a precise sharp point, a knife edge or chisel point located in such a manner as to intrude on the periphery of optical fiber 12 either flush with terminus tip 38 endface 42 or slightly below (approximately 0.003 mm max.) endface 42. Counterbore 40 allows cleaving tool point 82 to intrude on the optical fiber 12 periphery at the desired position. In this arrangement, the unsupported length of fiber in counterbore 40 allows slight bending of the fiber periphery at the intrusion of cleaving tool point 82. In the prior art, FIG. 8b, the fiber ends are shown in a similar yet significantly more shallow recessed area 7 but for a different reason. Here, optical fiber is cleaved flush with the surface 9 to avoid the possibility of protrusion 12a from hitting the opposite optical fiber 12 endface and causing damage. In the present invention, counterbore 40 is provided to allow a length of unsupported optical fiber 12 understanding that in the fiber end preparation of this approach it is known that protrusions such as 12a in FIG. 8b do not occur. It is because of the fiber cleaving at or slightly below endface 42 in FIG. 8a that the advantage of unsupported length can be used. Counterbore 40 in FIG. 8a is significantly deeper than recess 7 in FIG. 8b prior art.

Any epoxy bonding may be substituted with use of other bonding materials such as ceramic, glass, low-melt point metallic materials in liquid form or in preform "doughnuts" which are activated to a bonding condition by applying heat to the part at the time bonding is desired.

What is claimed is:

1. A terminus arrangement for terminating an optical fiber with cleaving (scoring the fiber periphery and applying either tension or bending to the fiber) of said optical fiber after first securing said optical fiber within a terminus or terminus sub-components, comprising;
   a first part having a continuous sidewall enclosing an internal cavity which is secured to said optical fiber or to the buffered fiber coating of said optical fiber by means of mechanical crimping on the periphery of said first part which secures the inside diameter or other inside configuration of said first part to the periphery of said optical fiber or to said buffer coating;
   a second part having a continuous sidewall enclosing an internal cavity with a relatively small internal diameter only slightly larger than the diameter of said optical fiber;
   said second part having a recess or counterbore at the tip face to allow an unsupported portion of said optical fiber, enabling improved fiber cleaving endface quality.

2. A terminus arrangement as in claim 1 with the securing of said optical fiber, or said buffered fiber coating with a sealant of adhesive such as epoxy.

3. A terminus arrangement as in claim 1 with the securing of said optical fiber, or said buffered fiber coating with a sealant of ceramic.

4. A terminus arrangement as in claim 1 with the securing of said optical fiber, or said buffered fiber coating with a sealant of glass.

5. A terminus arrangement as in claim 1 with the securing of said optical fiber, or said buffered fiber coating with a sealant of low-melt temperature metallic material.

6. A terminus arrangement as in claim 1 in which said first part is secured to said optical fiber after said second part is secured to said first part, with the final operation of termination being the severing of said optical fiber by means of cleaving, where said second part has an oversized opening at the exit of said optical fiber allowing both access to said optical fiber to allow selective location of said optical fiber cleaving and allowing freedom of said optical fiber to yield from axial position during said fiber cleaving which is known to enhance the quality of a cleaved fiber end for purposes of optical signal transmission.

7. A terminus arrangement as in claim 6 with securing of said optical fiber, or said buffered fiber coating to said first part with a sealant of adhesive such as epoxy.

8. A terminus arrangement as in claim 6 with securing of said optical fiber, or said buffered fiber coating to said first part with a sealant of ceramic.

9. A terminus arrangement as in claim 6 with securing of said optical fiber, or said buffered fiber coating to said first part with a sealant of glass.

10. A terminus arrangement as in claim 6 with securing of said optical fiber, or said buffered fiber coating to said first part with a sealant of low-melt temperature metallic material.

11. A terminus arrangement as in claim 1 in which said first part is secured to said optical fiber prior to the securing of said second part to said first part; whereby a fiber end may be prepared by cleaving prior to securing said second part to said first part.

12. A terminus arrangement as in claim 11 with securing of said optical fiber, or said buffered fiber coating to said first part with a sealant of adhesive such as epoxy.

13. A terminus arrangement as in claim 11 with securing of said optical fiber, or said buffered fiber coating to said first part with a sealant of ceramic.

14. A terminus arrangement as in claim 11 with securing of said optical fiber, or said buffered fiber coating to said first part with a sealant of glass.

15. A terminus arrangement as in claim 11 with securing of said optical fiber, or said buffered fiber coating to said first part with a sealant of low-melt temperature metallic material.

16. A terminus arrangement as in claim 11 in which said fiber end is prepared by polishing prior to securing said second part to said first part.

17. A terminus arrangement as in claim 16 with securing of said optical fiber, or said buffered fiber coating to said first part with a sealant of adhesive such as epoxy.

18. A terminus arrangement as in claim 16 with securing of said optical fiber, or said buffered fiber coating to said first part with a sealant of ceramic.

19. A terminus arrangement as in claim 16 with securing of said optical fiber, or said buffered fiber coating to said first part with a sealant of glass.

20. A terminus arrangement as in claim 16 with securing of said optical fiber, or said buffered fiber coating to said first part with a sealant of low-melt temperature metallic material.

21. A terminus arrangement as in claim 1 in which tension is applied axially to said optical fiber as it is cleaved by a cleaving point, edge or other tool.

22. A terminus arrangement as in claim 6 in which tension is applied axially to said optical fiber as it is cleaved by a cleaving point, edge or other tool.

23. A terminus arrangement as in claim 11 in which tension is applied axially to the fiber as it is cleaved by a cleaving point, edge or other tool.

24. A terminus arrangement as in claim 1 in which a relief hole is provided to enable using an alternative entry point for introducing adhesive to said first part.

25. A terminus arrangement as in claim 1 in which said second part is secured to said first part by means of an interference fit.

26. A terminus arrangement as in claim 1 in which said second part is secured to said first part by means of an adhesive bonding material such as epoxy in liquid state.

27. A terminus arrangement as in claim 26 with a preform, heat actuated adhesive bond.

28. A terminus arrangement as in claim 1 in which said second part is secured to said first part by means of a low-melt metallic material applied in melted, liquid form.

29. A terminus arrangement as in claim 28 with a preform, heat actuated low melt metallic adhesive bond.

30. A terminus arrangement as in claim 1 in which said optical fiber is secured within said second part by means of liquid adhesive.

31. A terminus arrangement as in claim 30 with a preform, heat actuated adhesive bond.

32. A terminus arrangement as in claim 1 in which said optical fiber is secured within said second part with a preform low melt metallic adhesive bond in liquid form.

33. A terminus arrangement as in claim 32 with a preform, heat actuated low-melt metallic adhesive bond.

* * * * *